April 10, 1928.
O. H. ESCHHOLZ
1,665,916
OVERHEAD WELDING
Filed Feb. 14, 1921
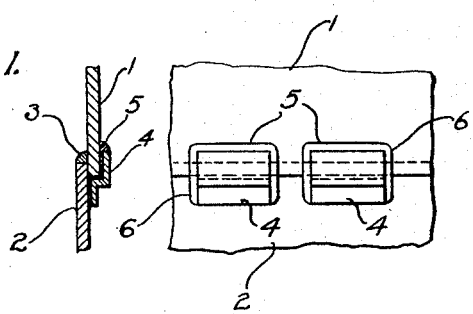
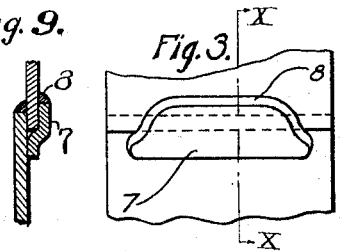
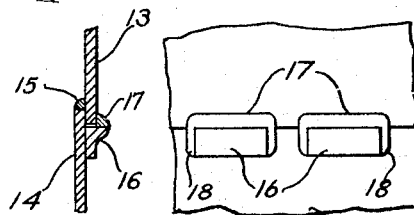
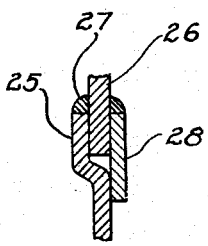
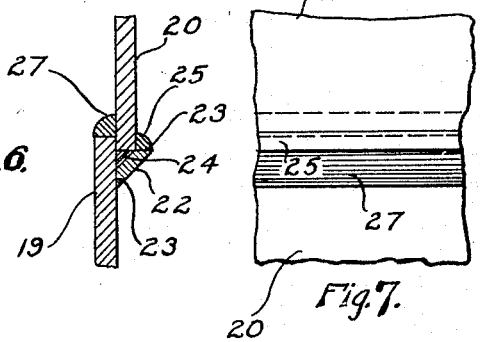
WITNESSES:
INVENTOR
Otto H. Eschholz.
BY
ATTORNEY Patented Apr. 10, 1928.

1,665,916

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

OVERHEAD WELDING.

Application filed February 14, 1921. Serial No. 444,710.

My invention relates to overhead welding, especially to a means for avoiding certain types of overhead welding.

In the manufacture of certain vertical structures, such as tanks, walls, ships' sides and structural works, it is customary to weld the joints by depositing the metal along the edges of both sides of a pair of lapped or "joggled" plates, one of which necessitates depositing the metal against the force of gravity. The inverted, or "overhead" weld, is more difficult to execute than flat, horizontal or vertical welds.

My invention reduces the difficulties encountered in overhead welding, it being among the objects thereof to provide means for welding lapped joints, with the electrode maintained in an easily manipulated position. It is another object of my invention to provide means for welding lap joints on a horizontal plane in a simple and efficient manner.

In practising my invention for welding vertical or inclined lapped plates, I deposit fused metal along the projecting edge of one member horizontally and provide a plurality of offset reinforcing members which I secure to the plates in close proximity to the joint by welding.

In the accompanying drawing, forming a part hereof, and in which like reference characters designate like parts, Figure 1 is a cross-sectional view of a welded lap joint having a substantially Z-shaped offset reinforcing member secured to a pair of plates, Fig. 2 is an elevational view of two of such reinforcing members welded in place, Fig. 3 is a perspective view of another form of reinforcing offset member having curved outlines along which metal is deposited, Fig. 4 is a cross-sectional view of a welded lap joint having a substantially L-shaped reinforcing member welded in place, Fig. 5 is an elevational view of the welded joint shown in Fig. 4, Fig. 6 is a cross-sectional view of a welded lap joint having a continuous strip welded to one of the members, Fig. 7 is an elevational view of the joint shown in Fig. 6, Fig. 8 is a cross-sectional view of a joggled joint, with one of the members offset and a straight reinforcing member secured across the joint, and Fig. 9 is a cross-sectional view of Fig. 3 taken along line X—X.

I may employ any one of a plurality of variously shaped reinforcing members, the use of any type of plate being a matter of convenience in application thereof. I provide a pair of plates 1 and 2 in contact with each other overlapping at the joint thereof. I deposit a layer of fused metal 3 horizontally along the edge of the plate 2 and secure a number of flat or Z-shaped reinforcing members 4 to the opposite sides of the plates by welding along the sides 5 and 6, I may employ an irregular curved reinforcing member 7 which is secured to the plates by welding along the side 8 where the edges of the plates 1 and 2 are contiguous, as in Fig. 3.

Another method similar to that shown in Fig. 1 is to join two plates 13 and 14 by welding along the edge 15 and securing an L-shaped reinforcing offset member 16 thereto by welding along the sides 18 and the horizontal edge 17.

Still another method consists in welding a continuous strip 22, having a chamfer 23 on both edges, to the member 19, placing a member 20 edgewise in contact with member 19, and then welding along the edges 21 and 25 to form a very strong joint.

Still another type of joint consists in an offset plate 25 which is placed in alignment with the plate 26 and is welded thereto along the edge 27, forming a joggled joint. A number of straight-edged reinforcing members 28 are then secured across the joint by welding along the top and sides in the same manner as the members 4, 7 and 16.

It will be readily seen that, by the above described methods, inverted welding is eliminated, as all of the metal is deposited along the sides and top of the reinforcing members and plates and, although a little more time is consumed in this type of construction, the advantages gained thereby are considerable.

Although I have described several specific embodiments of my invention, it will be apparent to those skilled in the art that various modifications may be made therein without departing from the principles herein set forth.

I claim as my invention:—

1. A welded joint comprising a pair of plates overlapping one another to provide a downwardly facing lower edge and a plurality of reinforcing offset members in proximity to the said lower edge of the overlapping portions, said offset members being secured to said plates by metal deposited along the side edges thereof.

2. The combination with a pair of metallic plates overlapping each other to provide a downwardly facing lower edge, of means for joining said edge to said other plate comprising a reinforcing plate and a downwardly deposited strip of fused metal.

3. The combination with a pair of metallic plates overlapping each other to provide a downwardly facing lower edge, a reinforcing member overlying said lower edge having a welding edge in proximity to both said lower edge and said other plate requiring downward deposition of fused metal, said reinforcing member being narrow relative to the widths of the plates.

4. The method of uniting the overlapped marginal edges of a pair of plates and a reinforcing member which consists in depositing fused metal along the upturned edge of said lapped plates and along the upturned edge of said reinforcing member on the other side thereof.

In testimony whereof, I have hereunto subscribed my name this 5th day of February, 1921.

OTTO H. ESCHHOLZ.